(12) United States Patent
Andeen et al.

(10) Patent No.: US 8,181,106 B2
(45) Date of Patent: May 15, 2012

(54) USE OF OVERRIDING TEMPLATES ASSOCIATED WITH CUSTOMIZABLE ELEMENTS WHEN EDITING A WEB PAGE

(75) Inventors: Richard Eric Andeen, Kirkland, WA (US); Gregory Chan, Seattle, WA (US); Zhenguang Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/406,733

(22) Filed: Mar. 18, 2009

(65) Prior Publication Data

US 2010/0241948 A1 Sep. 23, 2010

(51) Int. Cl.
G06F 17/00 (2006.01)
(52) U.S. Cl. .................. 715/235; 715/234; 715/249
(58) Field of Classification Search .................. None
See application file for complete search history.

(56) References Cited

U.S. PATENT DOCUMENTS

| | | | |
|---|---|---|---|
| 6,708,186 B1 | 3/2004 | Claborn et al. | 707/107 |
| 7,058,645 B2 | 6/2006 | Seto et al. | 707/101 |
| 7,089,583 B2 | 8/2006 | Mehra et al. | 726/3 |
| 7,114,147 B2 | 9/2006 | Ballantyne et al. | 717/107 |
| 7,143,344 B2 | 11/2006 | Parker et al. | 715/513 |
| 7,152,205 B2 | 12/2006 | Day et al. | 715/523 |
| 7,178,101 B2 | 2/2007 | Tunning | 715/513 |
| 7,191,394 B1 | 3/2007 | Ardeleanu et al. | 715/513 |
| 7,197,515 B2 | 3/2007 | Rivers-Moore et al. | 707/200 |
| 7,200,816 B2 | 4/2007 | Falk et al. | 715/762 |
| 7,228,497 B2 | 6/2007 | Lander | 715/513 |
| 7,278,096 B2 | 10/2007 | Sulistio et al. | 715/513 |
| 7,451,392 B1 | 11/2008 | Chalecki | |
| 2003/0237046 A1* | 12/2003 | Parker et al. | 715/513 |
| 2004/0044961 A1 | 3/2004 | Pesenson | 715/513 |
| 2004/0083453 A1 | 4/2004 | Knight et al. | 717/113 |
| 2005/0021548 A1 | 1/2005 | Bohannon et al. | 707/101 |
| 2005/0086584 A1 | 4/2005 | Sampathkumar | 715/501.1 |
| 2005/0132278 A1 | 6/2005 | Yoshida | 715/513 |
| 2005/0204347 A1 | 9/2005 | Jurkiewicz et al. | 717/137 |
| 2005/0246629 A1 | 11/2005 | Hu | 715/513 |
| 2006/0074981 A1 | 4/2006 | Mauceri et al. | |
| 2006/0129926 A1 | 6/2006 | Malek et al. | 715/530 |
| 2006/0193008 A1 | 8/2006 | Osaka | |

(Continued)

OTHER PUBLICATIONS

Office Action in U.S. Appl. No. 12/059,492 mailed Feb. 4, 2011, 18 pages.

(Continued)

*Primary Examiner* — Stephen Hong
*Assistant Examiner* — Asher Kells
(74) *Attorney, Agent, or Firm* — Merchant & Gould P.C.

(57) ABSTRACT

A method is presented for editing and saving a web page at a client based web-page editor. A rendered web page is received from a server computer and displayed at a web-page editor on the client computer. The client computer identifies one or more customizable web parts on the web page and also identifies one or more shared templates that are associated with the customizable web parts. Each identified shared template is copied as an overriding template. A data view of one or more web parts is edited, causing one or more of the overriding templates associated with the web part to be modified. When the edited changes are saved, the client computer sends a message to the server computer. The message includes the portions of the overriding templates that are modified as a result of the edited changes to the web page.

20 Claims, 8 Drawing Sheets

U.S. PATENT DOCUMENTS

| | | | |
|---|---|---|---|
| 2006/0212299 A1 | 9/2006 | Law | 705/1 |
| 2006/0242563 A1 | 10/2006 | Liu et al. | 715/513 |
| 2007/0083599 A1 | 4/2007 | Provo | 709/206 |
| 2007/0157078 A1 | 7/2007 | Anderson | 715/513 |
| 2007/0226608 A1 | 9/2007 | Virk et al. | 715/513 |
| 2008/0184102 A1 | 7/2008 | Selig | |
| 2008/0209345 A1 | 8/2008 | Cannata | |
| 2009/0249192 A1 | 10/2009 | Chan | |

OTHER PUBLICATIONS

Chase, "Tip: Use Imports and Includes to Override XSLT Templates," http://www.ibm.com/developerworks/xml/library/x-tipimpinc.html, 5 pages (Nov. 1, 2002).

Clark, "XSL Transformations (XSLT) Version 1.0," http://www.aifb.unikarlsruhe.de/Lehre/Sommer2004/ISWWW/w3c/xslt_1_on_1.pdf, 120 pages (Nov. 16, 1999).

Dong et al. "Optimization of XML Transformations Using Template Specialization," *Proceedings of the 5th International Conference on Web Information Systems Engineering (WISE)*, Springer Verlag LNCS vol. 3306, Brisbane, Australia, pp. 352-364 (Nov. 22-24, 2004).

DSpace Wiki, "Manakin theme tutorial," http://wiki.dspace.org/index.php/Manakin_theme_tutorial, 13 pages (May 19, 2008).

Groppe et al., "XPath Query Transformation based on XSLT Stylesheets," *WIDM'03*, New Orleans, Louisiana, pp. 106-110 (Nov. 7-8, 2003).

Microsoft Corporation, "FormXML," http://crmsdk.g-s.co.il/htm/v3d0isvformxml.htm, 1 page (2006).

Microsoft Corporation, "Microsoft SharePoint Designer Team Blog," http://blogs.msdn.com/sharepointdesigner/archive/2008/02/25/filtering-and-formatting-with-date-values.aspx, 26 pages (2008).

Muilwijk, "Automated Analysis of Unit Tests to Improve Understanding of Software Systems," *Master Thesis*, Utrecht University, Utrecht, The Netherlands, http://people.cs.uu.nl/visser/ftp/Mui05.pdf, 112 pages (Dec. 31, 2005).

U.S. Appl. No. 12/179,571, entitled "Declarative Forms and Views".

U.S. Appl. No. 12/059,492, filed Mar. 31, 2008 entitled "Creating a View from Multiple Templates".

Stylusstudio.com, "XSL Transformations (XSLT): Combining Stylesheets," http://www.stylusstudio.com/w3c/xslt/N103B7.htm, 2 pages (Copyright 2004).

"View Schema"—Microsoft Corporation copyright 2008, 7 pages.

Dubinko, Micah; "What are XForms"—XML.com copyright 1998-2006, 8 pages.

DuCharme, Bob; "Combining Stylesheets with Include and Import" dated Nov. 1, 2000, 6 pages.

Office Action in U.S. Appl. No. 12/179,571 mailed Dec. 22, 2010, 12 pages.

Office Action in U.S. Appl. No. 12/179,571 mailed Jun. 14, 2011, 11 pages.

Office Action in U.S. Appl. No. 12/059,492 mailed Aug. 16, 2011, 15 pages.

* cited by examiner

USE OF OVERRIDING TEMPLATES ASSOCIATED WITH CUSTOMIZABLE ELEMENTS WHEN EDITING A WEB PAGE

BACKGROUND

Online browser-based collaboration and document management systems can be used to host web sites that provide shared access to documents and workspaces. These collaboration and document management systems typically include a web-page editor that permits users to create or modify web pages.

A web page displayed in a web page editor typically includes web parts that may be edited. The web parts are typically associated with one or more templates used to render the web part. When a web page is edited, typically all the templates used to render the web parts are saved, even though all the templates may not be modified as a result of editing the web page.

SUMMARY

Embodiments of the invention are directed to systems and methods for editing a web page at a client based web-page editor and saving portions of overriding templates that are modified as a result of editing the web page. A rendered web page is received at a client computer from a server computer. In response to receiving the rendered web page, the client computer displays a view of the rendered web page at a web-page editor on the client computer. The view of the web page includes one or more web parts. The client computer identifies one or more web parts that are customizable. The client computer also identifies one or more shared templates that are associated with the one or more customizable web parts. A copy is made of each identified shared template associated with the one or more customizable web parts. Each copy of an identified shared template is an overriding template.

A data view of one or more web parts is edited. The editing of the data view of a web part causes one or more of the overriding templates associated with the web part to be modified. The edited changes to the web part are saved on the web-page editor. In response to saving the edited changes on the web-page editor, the client computer sends a message to the server computer. The message includes the portions of the overriding templates that are modified as a result of the edited changes to the web page.

The details of one or more techniques are set forth in the accompanying drawings and the description below. Other features, objects, and advantages of these techniques will be apparent from the description, drawings, and claims.

DESCRIPTION OF THIS DRAWINGS

DETAILED DESCRIPTION

The present disclosure is directed to systems and methods for editing customized data views of a web page on a client based web-page editor and saving portions of overriding templates that are modified as a result of editing the web page. The web page is typically rendered on a server from shared templates and displayed on the web-page editor on the client system. The templates are shared templates because they may be used to render web pages in a plurality of client systems. The web-page editor customizes data views of the web page by creating overriding templates for web-page parts that are edited and modifying the overriding templates without changing the shared templates.

The web page is typically rendered from the shared templates using XSLT (Extensible Stylesheet Language Transformations). The web page is customized by generating overriding XSLT templates from shared XSLT templates and saving edited changes to the web page in the overriding XSLT templates.

Figure 1:
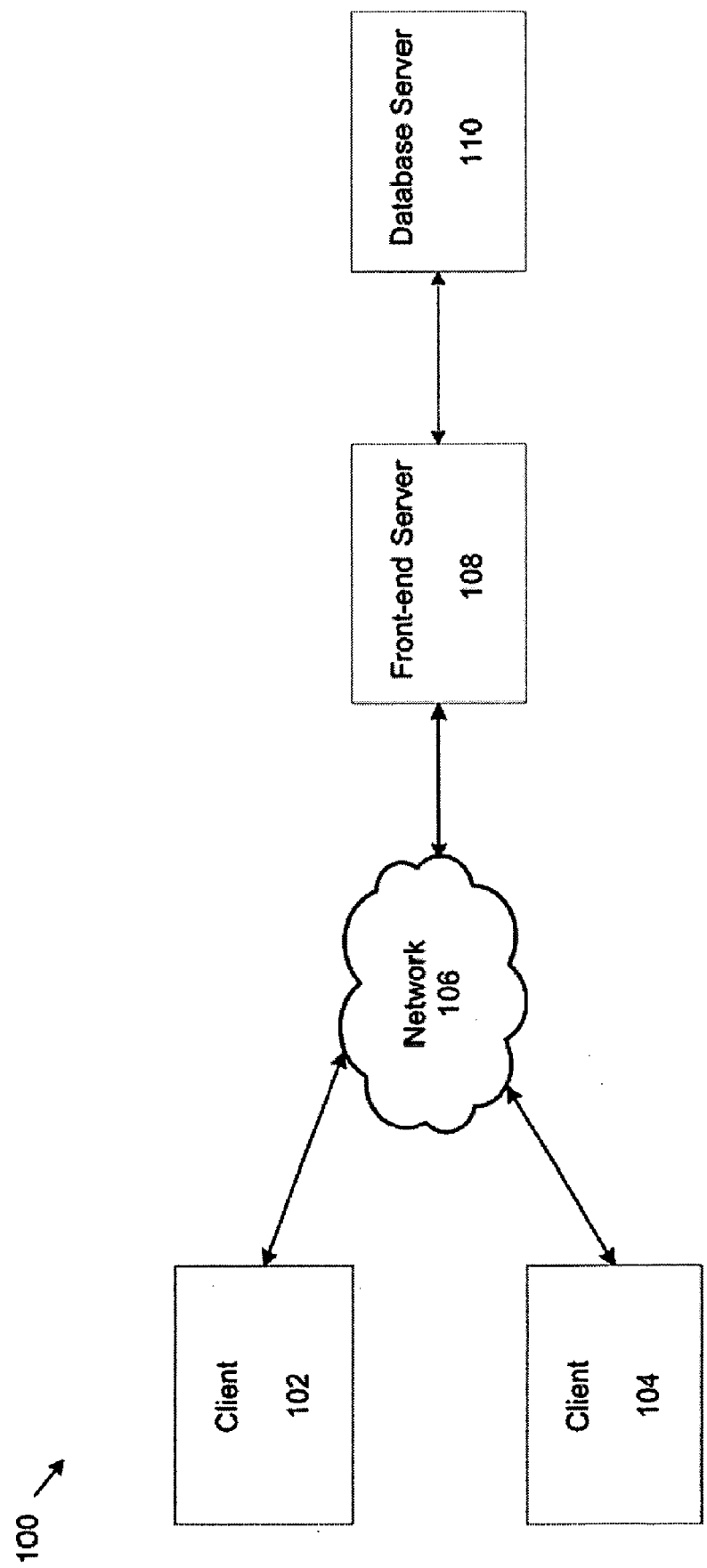
FIG. 1 shows an example system for overriding XSLT generation.

FIG. 1 shows an example system 100 for overriding XSLT generation. The example system 100 includes clients 102 and 104, network 106, front-end server 108 and database server 110. Greater or fewer clients, networks, front-end servers and database servers can be used.

In example embodiments, clients 102 and 104 are computing devices, such as desktop computers, laptop computers, terminal computers, personal data assistants, or cellular telephone devices. Clients 102 and 104 can include input/output devices, a central processing unit ("CPU"), a data storage device, and a network device. In example embodiments, client 102 includes a web-page editor and client 104 is a standard client that does not include a webpage editor. In the present disclosure, the terms client and client computer are used interchangeably.

Front-end server 108 and database server 110 are computing devices. Front-end server 108 is accessible to clients 102 and 104 through network 106. Database server 110 is typically not directly available to clients 102 and 104 and is accessed through front-end server 108. Front-end server 108 and database server 110 can include input/output devices a central processing unit ("CPU"), a data storage device, and a network device. In example embodiments, network 106 is the Internet and clients 102 and 104 can access front-end server 108 and resources on and connected to front-end server 108 and database server 108 remotely. In the present disclosure, the terms "server" refers to a computing device that acts like a server. Likewise, the term "server computer" also refers to a computing device that acts like a server.

In example embodiment, a web page is rendered on example front-end server 108 and sent to clients 102 and 104 upon request. In example embodiments, the example front-end server 108 renders the web page from shared XSLT templates stored on example front-end server 108, from XML data specific to the web page stored on example database server 110 and from any overriding templates associated with the web page stored on example database server 110.

XSLT (Extensible Stylesheet Language Transformation) is a language used for transforming XML documents into other XML documents. XSLT specifies how XML data for a web part is to be formatted when rendered on a web page. When rendering a web page on the example front-end server 108, XSLT transforms XML data into markup language, typically HTML, used to render the web page.

In example embodiments, client 102 includes a webpage editor, for example Sharepoint Designer 2007 from Microsoft Corporation of Redmond, Wash. Sharepoint Designer 2007 is a web-page editor that is used in conjunction with an online browser-based collaboration and document management system like Microsoft Sharepoint from Microsoft Corporation of Redmond, Wash. Sharepoint Designer 2007 is used create and edit web pages that can be made available to Sharepoint users.

When the example web-page editor opens an existing web page on client 102, client 102 makes a request for the web page to example front-end server 108 and example front-end server 108 returns a rendered view of the web page to example client 102.

When the example webpage editor on example client 102 receives the rendered web page from example front-end server 108, the example web-page editor analyzes the rendered web page to determine the XSLT templates used to render the web page. A web page consists of a plurality of web parts, a web part being any element that can be rendered on a web page.

A web page is typically rendered from a plurality of XSLT templates. For example, one or more XSLT templates may be used to specify the presentation of a table or a toolbar or a banner or any other web part that may be rendered. Because a table, toolbar, banner or similar component is a common component used on many web pages, the XSLT templates used to render these components are considered to be shared XSLT templates.

Some users may wish to customize web parts, for example to add a specific font to a table heading. However, if a shared XSLT template for the table is modified, the appearance of the table is altered for all users. In order to preserve the common XSLT templates used for a web part but also allow the web part to be customized, the example web-page editor on client 102 makes use of overriding XSLT templates.

An overriding XSLT template is a copy of an existing XSLT template. When a web page is rendered on the example web-page editor on client 102, the example web page editor analyzes the rendered view and identifies all shared XSLT templates needed to render the web parts in the rendered web page view. The example web-page editor then creates a copy of each identified shared XSLT template and designates each copy as an overriding template.

Often the same set of shared XSLT templates is used to render multiple fields in a web page view. For example, the same set of shared XSLT templates may be used to render every column in a table. In order to permit a user to makes changes to more than one column, a separate overriding template set is created for each column. In this example, more than one overriding template is crated from the same shared template. When an overriding template set is created, each overriding template in the overriding template set is renamed so that each overriding template in the overriding template set is uniquely identified.

When a user edits a web part on the example web-page editor, changes are made to the overriding XSLT templates corresponding to portion of the web part that is edited. There may be more than one overriding template associated with a web part but when the web part is edited, only some overriding templates may change. No changes are made to the shared XSLT templates. When the web page is saved at the example web-page editor, only the portions of the overriding XSLT templates that are modified are saved.

In example system 100, when the example web page is saved the portions of the overriding XSLT templates that are modified are included as text in the XML data of the web parts that are edited. The XML data for the web parts, including the modified portions of the overriding XSLT templates, are then transmitted from example client 102 across network 106 to example front-end server 108. The shared XSLT templates are not transmitted from example client 102 to example front-end server 108 because the shared XSLT templates are not modified. The example front-end server 108 transmits the XML data for the web parts to database server 110 to be stored.

In addition to opening an existing web page, the example webpage editor on example client 102 also creates new web pages. The example web-page editor includes the shared XSLT templates stored on example front-end server 108. When the example web-page editor adds new web parts to a new web page, the web parts are built from the associated shared XSLT templates included in the example web-page editor.

The example web-page editor on example client 102 typically has several views. In an example designer view, the web page appears as it would on a client system web browser. In an example data view, web parts are generally displayed in tabular form. Web parts are typically edited when in data view. In an example code view, the XSLT templates corresponding to the web part in data view are displayed.

An example online browser-based collaboration and document management system like Microsoft Sharepoint, typically uses lists to display data to client systems. In this regard, the data view of a web part is consistent with the list structure of typical online browser-based collaboration and document management systems like Microsoft Sharepoint.

Client 104 is an example browser-based client in example system 100. Example client 104 does not include a web-bared editor that can edit XSLT template riles. Example client 104 can make modifications to a web page displayed on the client 104 browser, but only by modifying the markup language that renders the web page.

When example client 104 makes a request for a web page to be displayed on the client 104 browser, example client 104 sends a request for the web page to example front-end server 108. Example front-end server 108 parses the request for the web page and determines the shared XSLT templates needed to render the web page. Example front-end server 108 also obtains the XML for the web parts included in the web page. The XML for the web parts included in the web page are stored on example database server 110.

The shared XSLT files are typically stored on example front-end server 108. The example front-end server 108 renders the web page from the shared XSLT templates stored on example front-end server 108, from the XML data for the web parts used on the web page and from any overriding XSLT templates stored with the XML data for the web parts. The XML data for the web parts and any associated overriding XSLT templates are stored on example database server 110. The example front-end server 108 then sends the rendered web page to example client 104 for display on the browser of example client 104.

Figure 2:
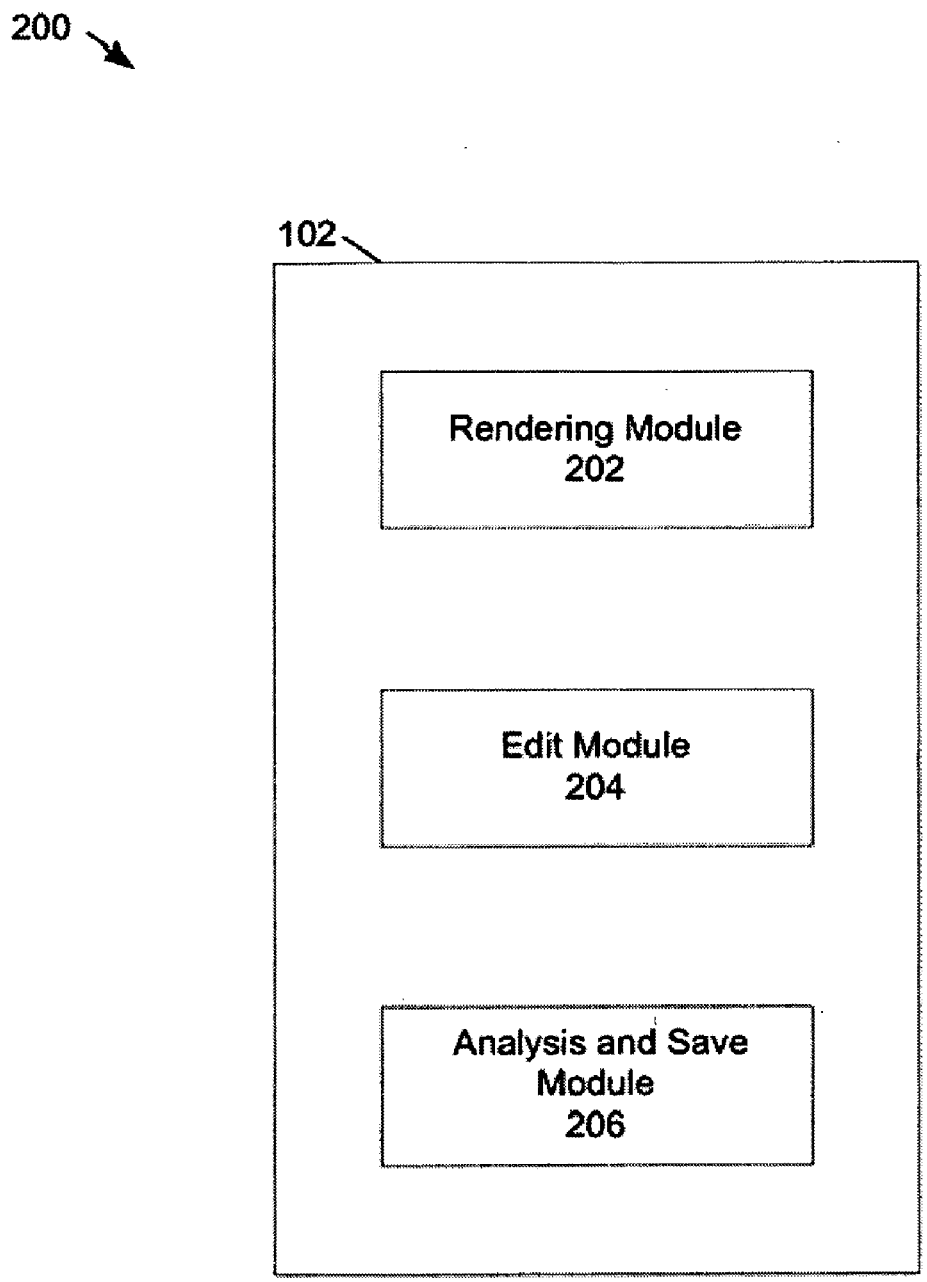
FIG. 2 shows example modules of a client-based web-page editor.

FIG. 2 shows example modules used in example client 102. Example client 102 includes an example webpage editor, for example Microsoft Sharepoint Designer 2007. The example client 102 includes example rendering module 202, example edit module 204 and example analysis and save module 206. The example rendering module 202 renders a web page in the example web-page editor. The rendered web page is obtained from example front-end server 108 when the web page is opened.

The example edit module 204 processes edits to a rendered web page view and permits a user to create new web-page views. The example web-page editor includes shared XSLT templates that correspond to web parts in the web page. When an existing web page is opened on the example web-page editor, the example edit module 204 analyzes the rendered view of the web page and determines the shared XSLT templates used to render the web parts on the web page. The example edit module 204 makes a copy of each shared XSLT template used to render customizable web parts on the web page, for which an overriding template does not already exist. Each copy of a shared XSLT template is designated as an overriding template.

Not all parts of a web page are customizable. For example, a toolbar is a web page component that is typically not customizable so the example edit module 204 does not make a copy of shared XSLT templates that are used to render the toolbar.

The example edit module 204 processes changes to the web parts in the web page view. Typically, edits to the web page are made in data view. A data view is a specific type of web part that renders collaboration data, for example Sharepoint data, into specific formats, typically tabular formats. The data view of a web part typically consists of one or more shared XSLT templates. For example, one shared XSLT template may specify the body of the table and other shared XSLT templates may specify fields within the table.

When a user edits a web part in the example web-page editor on example client 102, the overriding XSLT template corresponding to the portion of the web part that is modified is also modified. For example, if a user bolded a column heading in the web part, the overriding XSLT template corresponding to the column header is modified. When a change is made to a web part in data view, the overriding XSLT template corresponding to the change is displayed in code view. A user may view the changes to the XSLT template in code view and may make additional changes to the web part while in code view.

When a user saves changes to a web page made with the example web-page editor of client 102, the example analysis and save module 206 analyzes the saved web page to determine if any overriding XSLT templates associated with the web page were modified. If the example analyze and save module 206 determines that one or more overriding XSLT templates were modified, the modified portions of the overriding XSLT templates are incorporated as text in the XML data of the web parts associated with the overriding XSLT templates. The XML data of the web parts are then sent to example front-end server 108.

When the example front-end server 108 receives the XML data from example client 102 the example front-end server 108 determines whether the XML data includes any overriding XSLT templates. The presence of any overriding XSLT templates informs the example front-end server 108 that the overriding XSLT templates are to be used in place of the corresponding shared XSLT templates when rendering the web page.

The example front-end server 108 sends the XML data of the web parts received from example client 102 to be stored on example database server 110. By not uploading the shared XSLT templates to the example front-end server 108 and by only uploading the edited XML data of the web parts and the modified portions of the overriding XSLT templates, system performance is improved.

When an edited web page is saved, the example analysis and save module 206 also performs a callstack analysis on the modified overriding XSLT templates. The callstack analysis determines any additional XSLT templates that may need to be modified. When the example edit module 204 makes copies of all the customizable shared XSLT templates and creates corresponding overriding XSLT templates, often the customizable shared XSLT templates are renamed. For example, when a set of overriding XSLT templates is created from a set of customizable shared XSLT templates, for example when rendering several different columns in a table, each overriding XSLT template in the set of overriding XSLT templates is renamed.

The callstack analysis determines all the overriding templates that call the overriding XSLT templates that are modified. The name changes in the overriding XSLT templates that call the modified XSLT templates are also saved and sent to front-end server 108. Typically the callstack changes to the overriding templates are saved in the XML data of the overriding XSLT templates that are modified.

Figure 3:
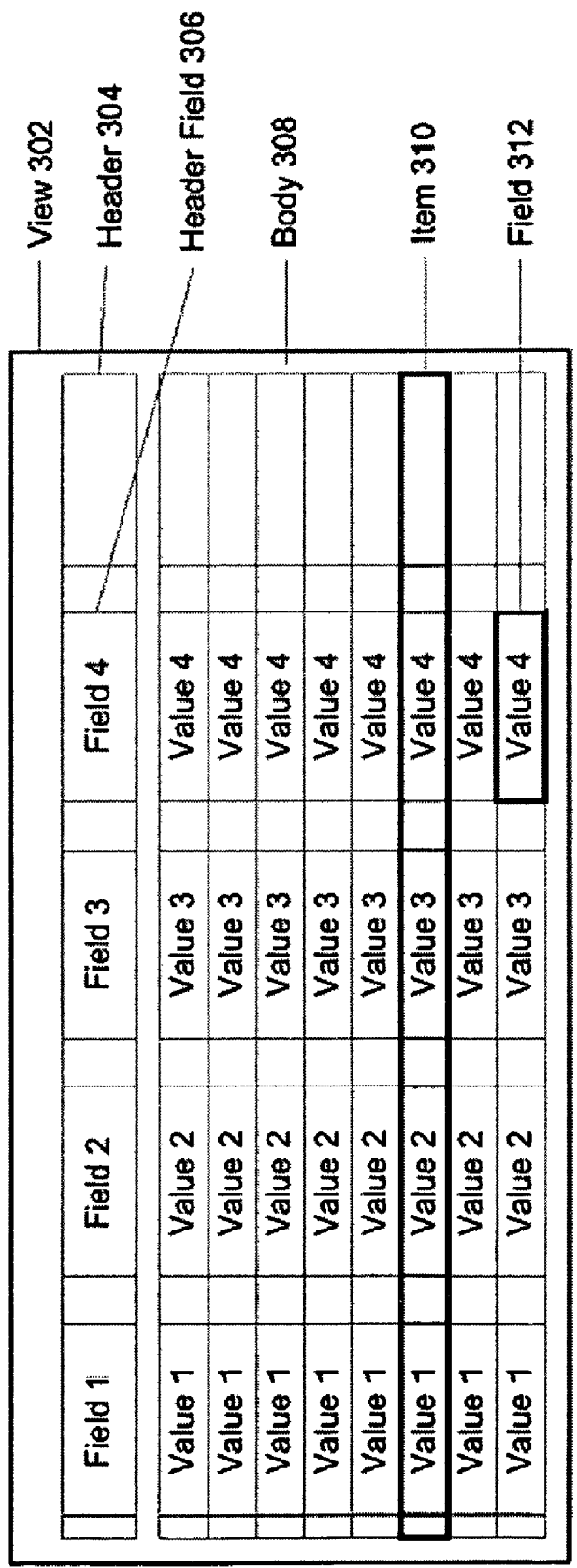
FIG. 3 shows a data view of an example web part

FIG. 3 shows an illustration of an example web part 30 displayed in data view on the example web-page editor of client 102. The example web part 300 is displayed in tabular form, with columns showing the fields on the web part and rows showing the values of each field. The tabular form is consistent with the display of lists in the online browser-based collaboration and document management system. For example, the example web part 300 may be a table displaying a list of books. The fields in the table may include the title, the author, the publisher, the year published, etc. The values in the rows show the title, author, publisher, year published, etc, for each book listed.

The example web part 300 is rendered from a plurality of templates. The example templates include view template 302, header template 304, header field template 306, body template 308, item template 310 and field template 312. The example view template 302 specifies format for the overall structure of the table. The example header template 304 specifies format of the structure of the table header, specifying that the example table header includes four fields, for example title, author, publisher, year published, etc. The example header field template 306 specifies the format of a specific header field, for example the publisher. For example, the publisher field may be bolded. The example body template 308 specifies format of the body of the example web part including the rows and the tables. The example item template 310 specifies the format of a row in the table, each row of the example table listing an individual book. The example field template 312 specifies the format of a specific field. For example, if field 4 represents the year published, the example template 312 specifies the font type and size of the year, the color that the in which the year is displayed, whether the year is bolded or italicized, etc.

Figure 4:
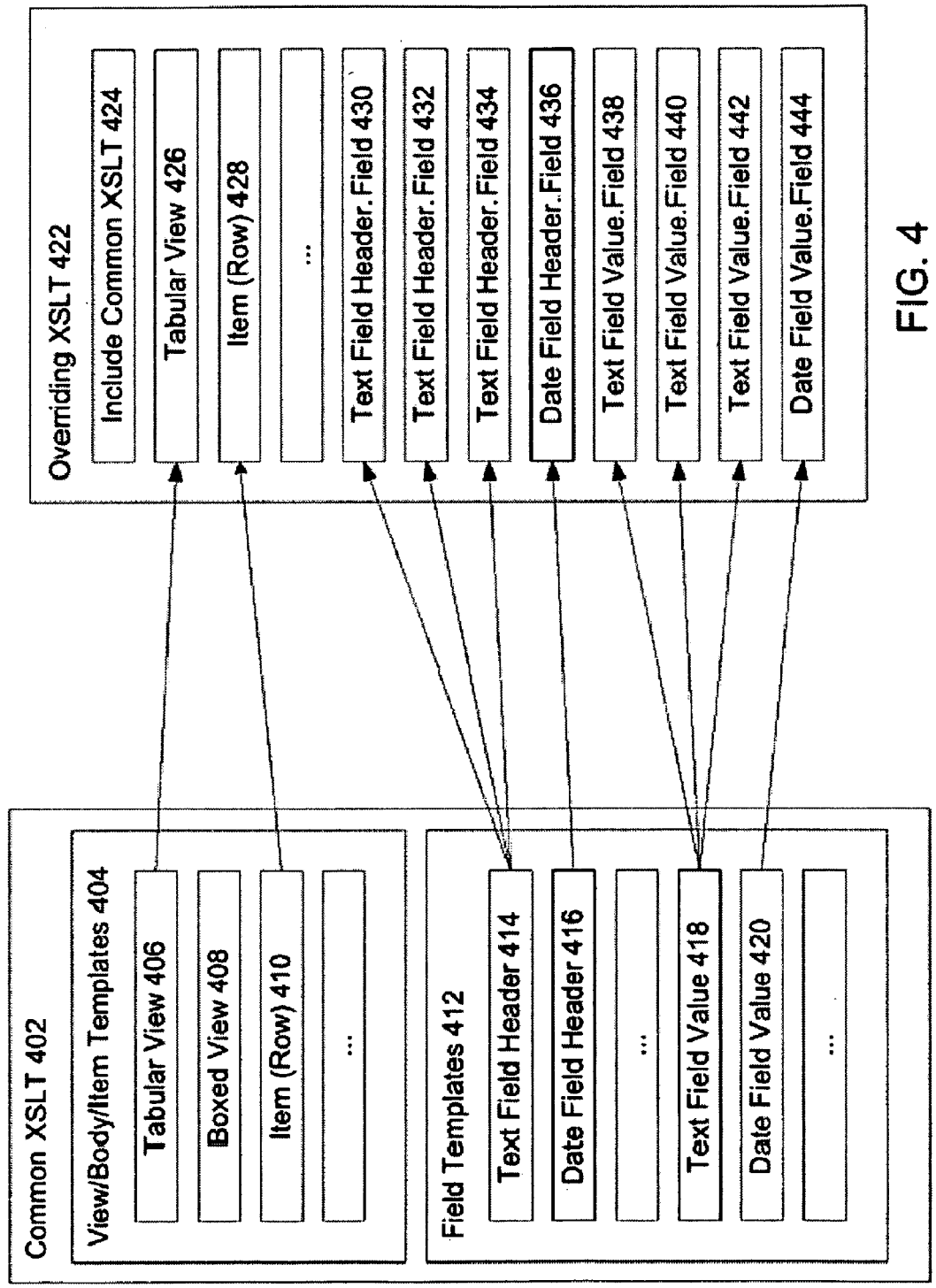
FIG. 4 shows example XSLT templates used to specify the format of a web part.

FIG. 4 shows an illustration of example XSLT templates 400 used to specify the format of an example web part. The example XSLT templates 400 include example common (shared) XSLT templates 402 and example overriding XSLT templates 422. The example common XSLT templates 402 include example view/body/item templates 404 and example field templates 412. The example view/body/item templates 404 include example tabular view templates 406, example boxed view templates 408 and example item (row) templates 410. The example tabular view templates 406 provide for displaying an example web part in tabular form. The example boxed view templates 408 provide for displaying an example web part in a boxed view, for example as a series of business cards. Other formats are possible in addition to tabular view and boxed view. The example item (row) templates provide for displaying items (rows) of the web part.

The example field templates 412 include a plurality of templates for displaying fields of the web part. Example field templates may include example text header field template 414 for formatting a text header field, example date header field template 416 for formatting a date header fields example text field value template 418 for formatting the value of a text field and example date field value template 420 for formatting the value of a date field. Other field templates are possible.

The example overriding XSLT templates 422 include example include common XSLT templates 424 that represent shared XSLT templates obtained from include or import statements in an example web-page text editor. The example overriding XSLT templates 422 also include tabular view template 426, item (row) template 428, text field header field templates 430, 432, 434 date field header field template 436, text field value field templates 438, 440, 442 and date field value field template 444.

The example templates 400 show that overriding tabular view template 428 is a copy of common (shared) tabular view template 406, overriding item (row) template 428 is a copy of common (shared) tabular view template 410, overriding text field header field templates 430, 432, 434 are copies of common (shared) text field header 414, date field header field template 436 is a copy of common (shared) date field header template 416, text field value field templates 438, 440, 442 are copies of text field value template 418 and date field value field template 444 is a copy of date field value template 420.

Figure 5:
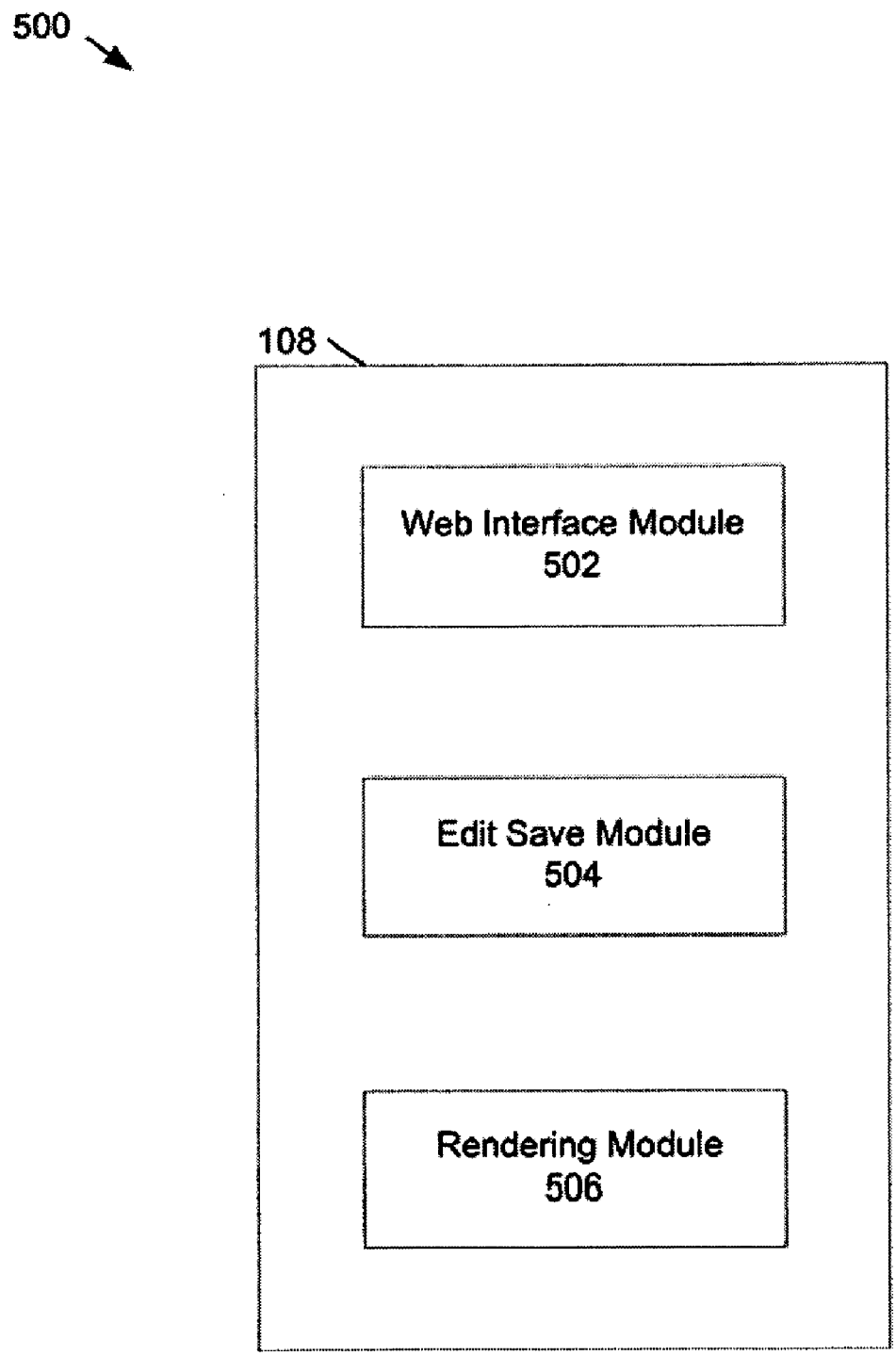
FIG. 5 shows example modules of a front-end server.

FIG. 5 shows the example modules 500 of example front-end server 108. The example front-end server 108 includes example web interface module 502, example edit save module 504 and example rendering module 506. The example web interface module 502 receives requests for web pages from clients 102 and 104 and returns rendered web pages to clients 102 and 104.

The example edit save module 504 receives information of edited changes to web page views from example web interface module 502. If the edited changes originated at a client that includes a web-page editor, for example client 102, the example edit save module, analyzes the saved changes. The edit save module sends the XML data of the modified web pans to example database server 110. The XML data of the modified web parts includes the modified portions of the overriding XSLT templates. Example database server 110 stores the XML data and stores the changes to the overriding XSLT templates. The overriding XSLT template associated with a web part is saved as part of the XML data of the web part.

The example rendering module 506 renders a web page for a client system, for example client 102 or client 104. The example rendering module 506 renders the web page from the shared XSLT templates stored on the example front-end server 108, from the XML for the web parts that comprise the web page, the XML for the web parts being obtained from the example database server 110, and from any overriding XSLT templates stored along with the web parts on example database server 110. When the web page is rendered from the shared XSLT templates, from the XML for the web parts and from any overriding XSLT templates, the example web interface module 502 sends the web page to the client system that requested the web page, for example client 102 or client 104.

Figure 6:
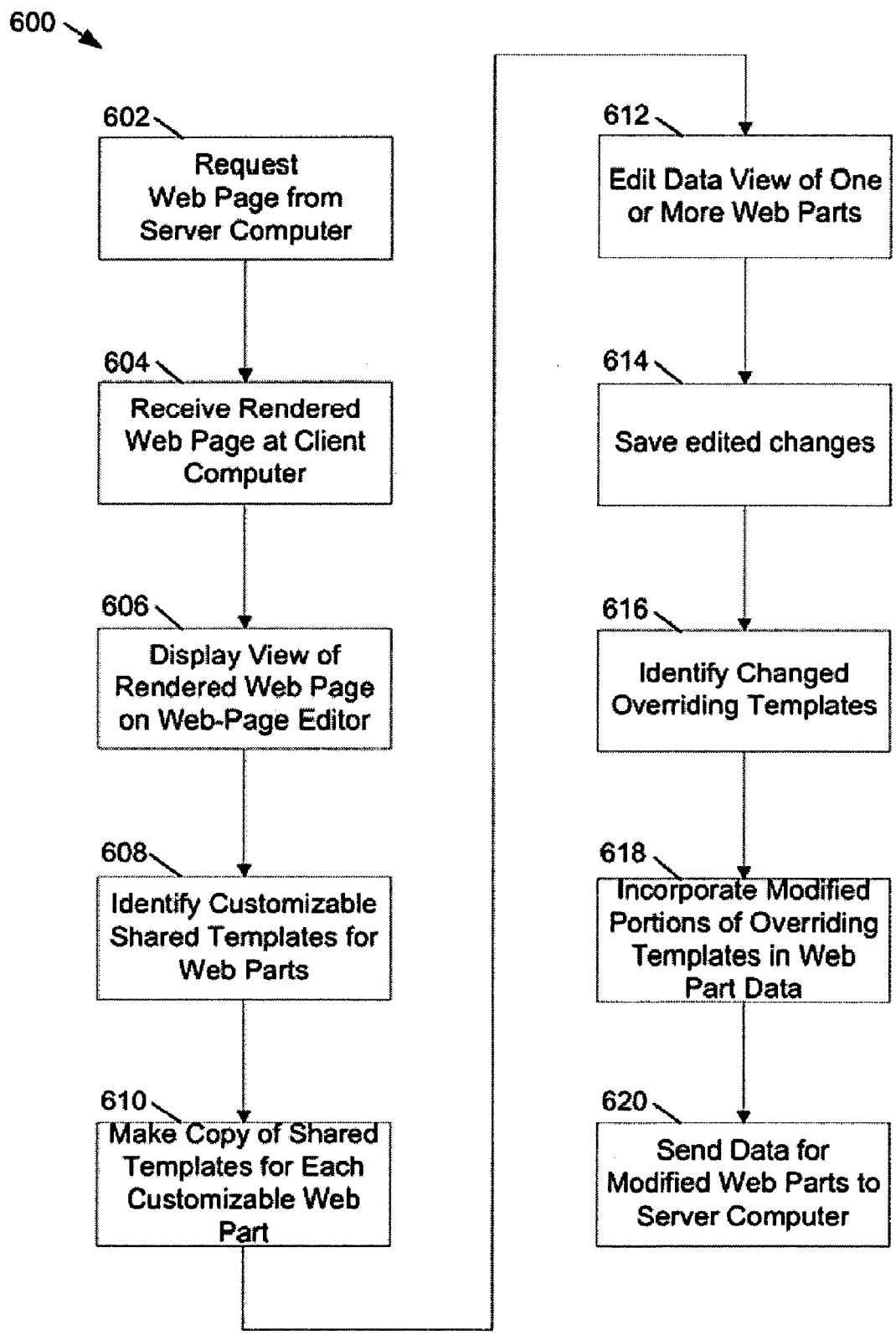
FIG. 6 shows a flow chart of an example edit operation performed at a client-based web-page editor.

FIG. 6 shows an example flowchart illustrating an example operation 600 performed by example client 102. In example operation 600, an example web-page editor on example client 102 opens and edits an existing web page. At operation 602, example client 102 opens an existing web page on the example web-page editor on client 102 and requests the web page from example front-end server 108.

At operation 604 a rendered web page is received by client 102. At operation 606 a view of the rendered web page is displayed on the example web-page editor on client 102. At operation 608, the example web-page editor on example client 102 identifies the shared XSLT templates used to tender the customizable web parts in the data view of the web page.

At operation 610, example edit module 204 on the example web-page editor makes a copy of the shared XSLT templates used to render the identified customizable web part. Each copy of a customizable shared XSLT template is an overriding template. The overriding XSLT templates are created at operation 610 but they are not displayed.

At operation 612, a user of the example web-page editor edits the data view of one or more web parts. At operation 614, the example analysis and save module 206 saves the edited web page. At operation 616, the example analysis and save module 206 identifies the portions of all the overriding XSLT templates that are modified as a result of the edit. At operation 618, the modified portions of the identified overriding XSLT templates are incorporated into the XML data of the edited web parts that use the identified XSLT templates. At operation 620, the XML data for the modified web parts are sent to example front-end server 108. The XML data for the modified web parts includes the modified portions of the XSLT overriding templates associated with the web parts.

Figure 7:
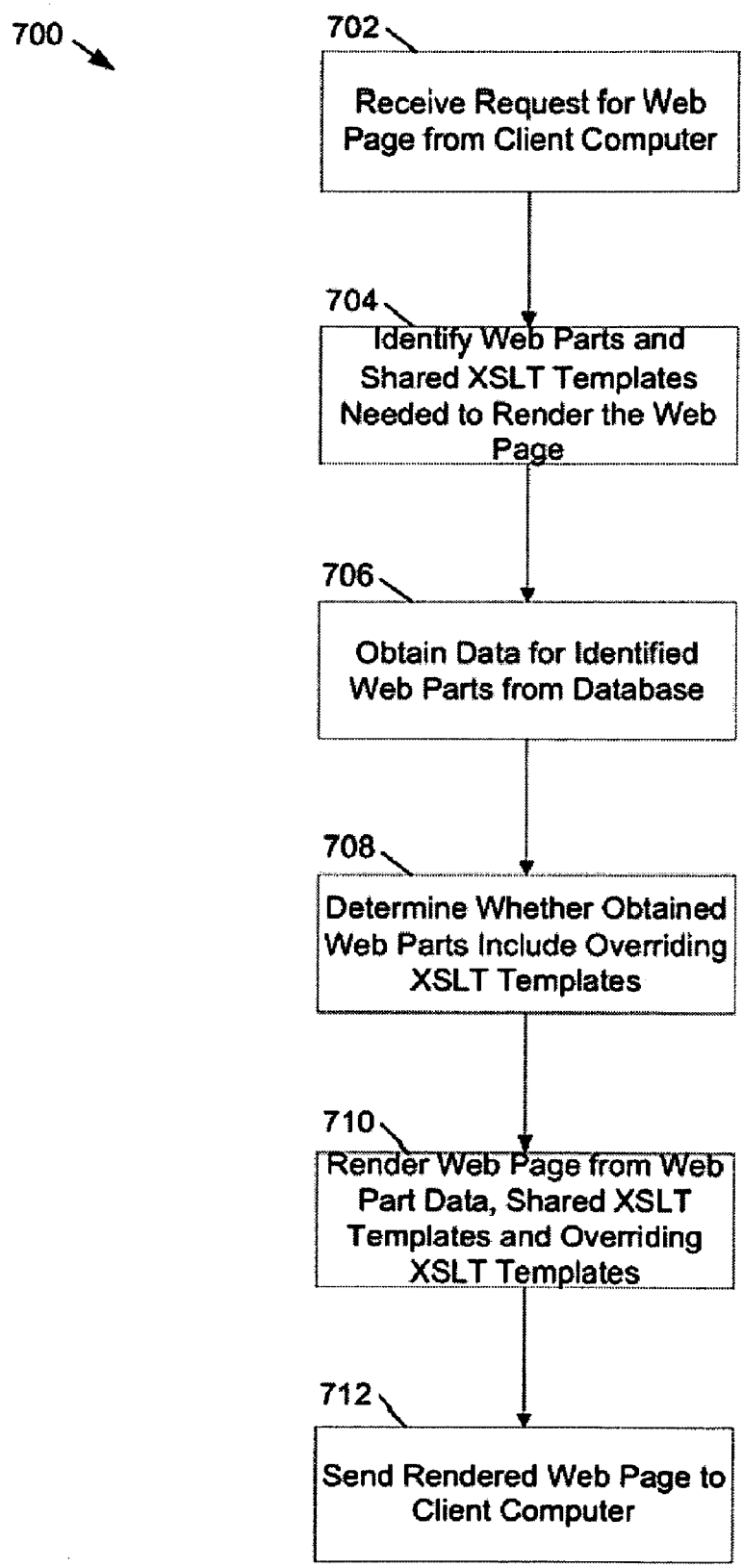
FIG. 7 shows a flow chart of an example web-page rendering operation performed at front-end server.

FIG. 7 shows an example flowchart illustrating an example operation 710 performed by example front-end server 108. In example operation 700, example front-end server renders a web page to be displayed on example client 102. At operation 702, example front-end server 108 receives a request for a web page from example client computer 102. At operation 704 the example front-end server 108 identifies the web parts and the shared XSLT templates needed to render the web page.

At operation 706, XML data for the identified web parts are obtained from example database server 108. At operation 708, the example front-end server 108 determines whether the obtained XML data for the web parts includes any overriding XSLT templates.

At operation 710, the web page is rendered from the XML data of the identified web parts, from the shared XSLT templates and from any identified overriding XSLT templates. The web page is rendered in a markup language, typically HTML. When rendering the web page, the example front-end server 108 uses any identified overriding XSLT templates in place of the corresponding sections of the shared XSLT templates.

At operation 712, the rendered web page is sent to the client computer that requested the web page. When the rendered web page is requested from example client 102, the rendered web page is displayed in the example web-page editor of example client 102. When the rendered web page is requested from example client 104, the rendered web page is displayed on the web-based browser of example client 104.

Figure 8:
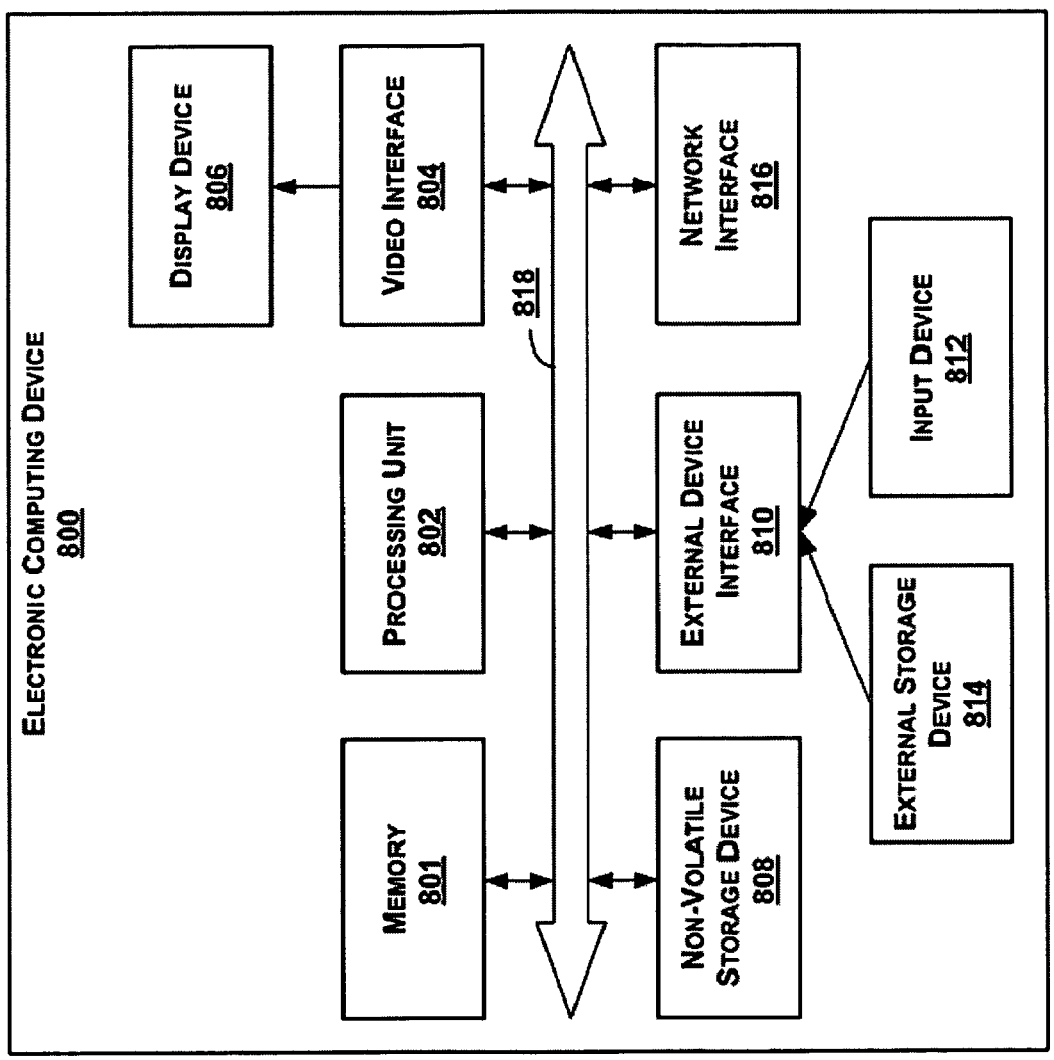
FIG. 8 shows an operating environment for a system that can be used for overriding XSLT generation.

FIG. 8 is a block diagram illustrating example physical components on an electronic computing device 800. Client systems 102 and 104 and server systems 108 and 110 and/or electronic computing devices within client systems 102 and 104 and/or server systems 108 and 110 may be implemented in the manner of electronic computing device 800. As illustrated in the example of FIG. 8, electronic computing device 800 comprises a memory unit 801. Memory unit 801 is a computer-readable data storage medium that is capable of storing data and instructions. Memory unit 801 may be a variety of different types of computer-readable data storage media including, but not limited to, dynamic random access memory (DRAM), double data rate synchronous dynamic random access memory (DDR SDRAM), reduced latency DRAM, DDR SDRAM, DDR3 SDRAM, Rambus RAM, or other types of computer-readable data storage media.

In addition, electronic computing device 800 comprises a processing unit 802. In a first example, processing unit 802 may execute software instructions that cause processing unit 802 to provide specific functionality. In this first example, processing unit 802 may be implemented as one or more processing cores and/or as one or more separate microprocessors. For instance, in this first example, pressing unit 802 may be implemented as one or more Intel Core2 microprocessors. Processing unit 802 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 802 may be implemented as an application specific integrated circuit (ASIC) that provides specific functionality. In a third example, processing unit 802 may provide specific functionality by using an ASIC and by executing software instructions.

Electronic computing device 800 also comprises a video interface 804 that enables a clients system (102 and 104) or a server system (108 and 110) to output video information to display device 806. Display device 806 may be a variety of different types of display devices. For instance, display device 806 may be a cathode-ray tube display, an LCD display panel, a plasma screen display panel, a touch-sensitive display panel, a LED array, or another type of display device.

In addition, electronic device 802 includes a non-volatile storage device 808. Non-volatile storage device 108 is a computer-readable data storage medium that is capable of storage data and/or instructions. Non-volatile storage device 808 may be a variety of different types of different non-volatile storage devices. For example, non-volatile storage device 808 may be one or more hard disk drives, magnetic tape drives, CD-ROM drives, DVD-ROM drives, Blu-Ray disc drives, or other types on non-volatile storage devices.

Electronic computing device 80, also includes an external component interface 810 that enables client systems 102 and 104 and server systems 108 and 110 to communicate with external components. As illustrated in the example of FIG. 8, external component interface 810 communicates with an input device 812 and an external storage device 814. In one implementation of electronic computing device 800, external component interface 810 is a Universal Serial Bus (USB) interface. In other implementations of electronic computing device 800, electronic computing device 800 may include another type of interface that enables electronic computing device 800 to communicate with input device, and/or output devices. For instance, electronic computing device 800 may include a PS/2 interface. Input device 812 may be a variety of different types of devices including, but not limited to keyboards, mice, trackballs, stylus input devices, touch pads, touch-sensitive display devices, touch-sensitive display screens, or other types of input devices. External storage device 814 may be a variety of different types of computer-readable data storage media including magnetic tape, flash memory modules, magnetic disk drives, optical disc drives, and other computer-readable data storage media.

In addition, electronic computing device 800 includes a network interface 816 that enables electronic computing device 800 to send data to and receive data from network 110. Network interface 816 may be a variety of different types of network interface. For example, network interface 816 may be an Ethernet interface, a token-ring interface, a fiber optic interface, a wireless network interface (e.g. WiFi, WiMax, etc.), or another type of network interface.

Electronic computing device 800 also includes a communications medium 818 that facilitates communication among the various components of electronic computing device 800. Communications medium 818 may comprise one or more different types of communication media including, but not limited to, a PCI bus, a PCI Express bus, an accelerated graphics port (AGP) bus, an Infiniband interconnect, a serial Advanced Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 8 (i.e. memory unit 801, non-volatile storage device 808, and external storage device 814). Together, these computer-readable data storage media may constitute a single logical computer-readable data storage medium. This single logical computer-readable data storage medium may store instructions executable by processing unit 802. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 802, to perform the action.

The various embodiments described above are provided by way of illustration only and should not be construed to limiting. Various modifications and changes that may be made to the embodiments described above without departing from the true spirit and scope of the disclosure.

What is claimed is:

1. A method for editing a web page at a client computer, the method comprising:
    receiving a rendered web page at the client computer from a server computer;
    in response to receiving the rendered web page at the client computer, displaying a view of the rendered web page on a web-page editor at the client computer, the view of the web page including one or more web parts, the view of the web page including a plurality of shared templates;
    in response to receiving the rendered web page at the client computer, identifying one or more web parts that are customizable, each web part being an element on the rendered web page;
    in response to receiving the rendered web page at the client computer, for each of the one more web parts that are identified as being customizable, identifying one or more of the plurality of shared templates that are associated with the one or more customizable web parts;
    making a copy of each identified shared template associated with each of the one or more customizable web parts, the identified shared templates for which copies are made being fewer than the plurality of shared templates for the rendered web page, each copy of an identified shared template being an overriding template;
    editing a data view of one or more web parts on the web-page editor, the editing of the data view of a web part causing one or more of the overriding templates associated with the web part to be modified;
    saving the edited changes to the web page on the web-page editor;
    in response to saving the edited changes to the web page on the web-page editor, sending a message from the client computer to the server computer, the message including the portions of the overriding templates that are modified as a result of the edited changes to the web page.

2. The method of claim 1, wherein saving the edited changes to the web page comprises analyzing the view of the web page, the analyzing the view of the web page comprising identifying the one or more web parts that are edited and identifying the modified portions of the one or more overriding templates that are modified.

3. The method of claim 2, wherein saving the edited changes to the web page further comprises incorporating the modified portions of the one more overriding templates that are modified into XML data for the web parts that are modified as a result of the edited changes.

4. The method of claim 1, wherein saving the edited changes to the web page further comprises identifying each template in the callstack of each overriding template that is changed.

5. The method of claim 4, wherein saving the edited changes to the web page further comprises identifying changes to each template in the callstack of each overriding template that is changed and incorporating the identified changes in XML data of the web part associated with each overriding template that is changed.

6. The method of claim 1, wherein the shared templates and the overriding templates are XSLT templates.

7. The method of claim 1, wherein at least two overriding templates are copies of the same shared template.

8. The method of claim 1, wherein the web-page editor includes a data view and a code view.

9. The method of claim 8, wherein when a web part is edited in data view, an overriding template associated with the edit is displayed in code view.

10. The method of claim 9, wherein additional edits to the data view of the web part are made to the overriding template in code view.

11. An electronic device for designing a web page, the electronic device including:
   a rendering module that displays the web page, the web page being displayed using a markup language, the web page including one or more web parts, each web part being an element on the web page;
   an editing module, the editing module including a plurality of shared templates for the web page, each shared template being associated with a web part on the web page, the editing module identifying one or more of the one or more web parts included on the web page that are customizable, the editing module making a copy of each shared template associated with the one or more web parts included on the web page that are customizable, the customizable shared templates for which copies are made being a subset of the plurality of shared templates for the web page, each copy of a shared template being an overriding template, the editing module modifying an overriding template associated with a web part when the web part is edited; and
   an analysis and save module, the analysis and save module identifying the modified portion of each overriding template that is modified, the analysis and save module saving the modified portion of each overriding template that is modified.

12. The electronic device of claim 11, wherein the analysis and save module incorporates the modified portion of each overriding template that is modified into XML data of the web parts that are edited.

13. The electronic device of claim 11, wherein the analysis and save module further identifies templates in a callstack for the overriding templates that are modified, the analysis and save module saving the modified portions of each identified template in the callstack.

14. The electronic device of claim 13, wherein the analysis and save module incorporates the modified portions of each identified template in the callstack into XML data of the web parts that are edited.

15. The electronic device of claim 11, wherein each shared template and overriding template is an XSLT template.

16. The electronic device of claim 11, wherein the editing module includes a code view and a data view.

17. The electronic device of claim 16, wherein when the editing module identifies that a web part is modified in data view, an overriding template corresponding to the web part is displayed in code view.

18. The electronic device of claim 11, wherein each overriding template includes one or more fields, each field including one or more values.

19. The electronic device of claim 18, wherein the edit module creates an overriding template for each field that is modified.

20. A computer-readable data storage medium comprising instructions that, when executed by a processing unit of a client computer, cause the client computer to:
   receive a web page at the client from a server computer,
   in response to receiving the web page, display a view of the rendered web page on a web-page editor at the client computer, the view of the web page including one or more web parts, the view of the rendered web page including a plurality of shared XSLT templates;
   in response to receiving the rendered web page at the client computer, identify one or more web parts that are customizable, each web part being an element on the rendered web page;
   in response to receiving the rendered web page at the client computer, for each of the one or more web parts that are identified as being customizable, identify one or more of the plurality of shared XSLT templates that are associated with the one or more customizable web parts;
   in response to identifying one or more shared XSLT templates that are associated with the one or more customizable web parts, make a copy of each identified shared XSLT template associated with each of the one or more customizable web parts, the identified shared XSLT templates for which copies are made being fewer than the plurality of shared templates for the rendered web page, each copy of an identified shared XSLT template being an overriding XSLT template;
   edit a data view of one or more web parts on the web-page editor, the editing of the data view of a web part causing one or more of the overriding XSLT templates associated with the web part to be modified;
   in response to editing a data view of one or more web parts on the web-page editor, identify one or more web parts that are edited;
   in response to identifying one or more web parts that are edited, identify the modified portions of the one or more overriding XSLT templates that are edited;
   in response to editing a data view of one or more web parts on the web-page editor, identify changes to each template in the callstack of each overriding XSLT template that is modified;
   in response to identifying changes to each template in the callstack of each overriding XSLT template that is modified, identify the modified portions of each template in the callstack of each overriding XSLT template that is modified;
   save the edited changes to the web page;
   in response to saving the edited changes to the web page, incorporate the modified portions of the one more overriding XSLT templates that are modified into XML data for the web parts that are modified as a result of the edited changes;

in response to saving the edited changes to the web page, incorporate the modified portions of each template in the callstack of each overriding XSLT template that is modified into XML data for the web parts that are modified as a result of the edited changes; and in response to saving the edited changes to the web page on the web-page editor, sending a message from the client computer to the server computer, the message including the XML data for the web parts that are modified as a result of the edited changes to the web page.

* * * * *